C. C. Post.
Sap Spout.
No. 84,302. Patented Nov. 24, 1868.

Witnesses.
A. Leclerc
J. M. Coombs

Inventor:
C. C. Post
per Brown Coombs & Co.
attys

CHARLES C. POST, OF HINESBURG, VERMONT.

Letters Patent No. 84,302, dated November 24, 1868.

IMPROVEMENT IN SAP-SPILES.

The Schedule referred to in these Letters Patent and making part of the same.

*To all whom it may concern:*

Be it known that I, CHARLES C. POST, of Hinesburg, in the county of Chittenden, and State of Vermont, have invented a new and useful Improvement in Sap-Spiles; and I do hereby declare that the following is a full, clear, and exact description of the same, reference being had to the accompanying drawings, making a portion of this specification, in which—

Similar letters of reference indicate corresponding parts in both figures.

Figure 1:
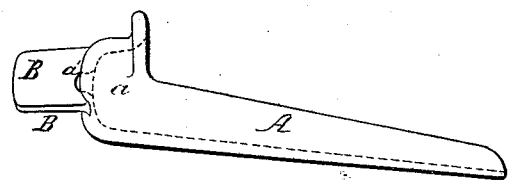
Figure 1 is a side view of a sap-spile made according to my invention.
Figure 2:
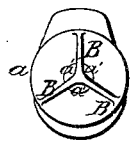
Figure 2 is an end view of the same.

Much objection exists to the ordinary sap-spile, inasmuch as, by its use, the outermost portion of the tap or hole in the tree is plugged by the spile, thus materially diminishing the flow of sap therefrom. This invention is designed to obviate this objection; and it consists in a spile, provided at its inner end with any desired number of fins, so arranged, that, when driven into the tap or hole, they will retain the spile in proper position, without impeding the flow of sap throughout the entire length of the tap or hole.

To enable others to understand the nature and construction of my invention, I will proceed to describe it with reference to the drawings.

The body, A, of the spile may be spout-shaped, or of other suitable form, with its inner-end portion made of nearly or quite cylindrical form, as shown at $a$, such portion being closed, except that it is perforated with holes, $a'$, corresponding in number with longitudinal fins, B, formed upon the end just mentioned, and nearly or quite radial to the longitudinal axis of the end-portion $a$, the holes $a'$ being arranged to communicate with the spaces between the pins, and the latter being made with their outer edges comparatively sharp or narrow. The length of these pins is such, that, when driven longitudinally into the tap or hole in the tree, their outer edges will bite into the inner surface of such tap or hole with sufficient tenacity to hold the spile firmly thereto, the inner-end portion, $a$, being brought snugly to the outer end of the tap, so as to close the latter, and prevent leakage around the just-mentioned end-portion of the spile.

Inasmuch as the narrow edges of the fins are in contact with only a very small fraction of the internal surface of the tap or hole, it follows that no material obstruction is offered to the flow of sap from all portions of the latter into the spaces between the fins, and thence, through the holes $a$, to the body, A, of the spile.

What I claim as my invention, and desire to secure by Letters Patent, is—

The sap-spile, constructed with the longitudinal fins B, whereby it may be held or retained in the tap or hole in the tree, without materially interfering with the flow of the sap, substantially as herein set forth.

CHAS. C. POST.

Witnesses:
H. W. FRASER,
PERRY REID.